United States Patent [15] 3,657,666

Patel [45] Apr. 18, 1972

[54] SPIN-FLIP LIGHT SCATTERING AND GUNN EFFECT-TYPE OSCILLATIONS IN MULTIVALLEY SEMICONDUCTORS SUBJECT TO A MAGNETIC FIELD

[72] Inventor: Chandra Kumar Naranbhai Patel, Summit, N.J.

[73] Assignee: Bell Telephone Laboratories Incorporated, Murray Hill, N.J.

[22] Filed: Oct. 29, 1970

[21] Appl. No.: 85,040

[52] U.S. Cl. ..........331/107 G, 307/88.3

[51] Int. Cl. ..........H03b 7/06, H03f 7/00

[58] Field of Search ..........307/88.3; 331/107, 107 G

[56] References Cited

UNITED STATES PATENTS 3,590,267 6/1971 Patel..........331/107

3,590,268 6/1971 Patel..........331/107

*Primary Examiner*—John Kominski

*Attorney*—R. J. Guenther and Arthur J. Torsiglieri

[57] ABSTRACT

Improved stimulated spin-flip Raman scattering and Gunn effect-type oscillations are provided in degenerate multivalley semiconducting materials such as lead telluride. Both phenomena may be obtained in an apparatus of the same configuration either independently or simultaneously. Under the influence of an applied electric field, the stimulated spin-flip Raman scattering is characterized by an increase in its saturation level, thus providing increased Raman oscillator output power. The Gunn effect-type oscillations are of the microwave frequency range and can be coupled to an external circuit to give a microwave power output. Tunability in both cases is achieved by varying an applied magnetic field which determines the spacing between the spin sublevels of the Landau levels in the semiconductor.

15 Claims, 7 Drawing Figures

INVENTOR
C.K.N. PATEL
BY Wilford L. Wisner
ATTORNEY

SPIN-FLIP LIGHT SCATTERING AND GUNN EFFECT-TYPE OSCILLATIONS IN MULTIVALLEY SEMICONDUCTORS SUBJECT TO A MAGNETIC FIELD

BACKGROUND OF THE INVENTION

In the coherent optical device art, a highly desirable sort of device is one that is tunable over a broad band of frequencies and has a reasonably large coherent power output. Recent proposals for such devices employing inelastic scattering from mobile charge carriers in the presence of a magnetic field in materials having nonparabolic conduction bands are disclosed in U.S. Pat. No. 3,435,373 to P. A. Wolff, issued Mar. 25, 1969, and in U.S. Pat. No. 3,470,453 to P. A. Fleury, C. K. N. Patel, R. E. Slusher, and T. Yafet, issued Sept. 30, 1969, both of which are assigned to the assignee hereof.

These patents describe types of scattering from mobile charge carriers in nonparabolic conduction bands that can be termed Raman scattering. Thus far, three types of processes responsible for Raman scattering have been found: spin-flip with $\Delta s=1$ and $\Delta l=$, and $\Delta l=1$, and $\Delta l=2$ where $l$ is the Landau level quantum number, and $s$ is the spin state quantum number.

The spin-flip process is most promising for achieving stimulated Raman scattering because its cross section for the scattering is at least an order of magnitude larger than the $\Delta l=1, 2$ Raman cross sections for most materials which have been investigated so far. Unfortunately, most prior art proposals for stimulated spin-flip Raman scattering show a distinct saturation of the Raman oscillator power output at high input power levels. The spin saturation in such devices results in a decrease in Raman gain at high input power levels making it increasingly difficult to obtain high tunable power output from the stimulated scattering process.

There have been ways proposed of increasing the saturation level of the stimulated Raman scattering, such as introducing paramagnetic impurities into the semiconductors. Nevertheless, it is not entirely clear that such a technique will not ruin the otherwise good optical quality of the material needed for low-loss operation.

It is therefore an object of the present invention to develop a spin-flip Raman oscillator with an increased saturation level for stimulated spin-flip Raman scattering. This, in turn, results in increased capabilities for obtaining higher Raman oscillator power.

Additionally, in the past several years, it has been found that several bulk semiconductive materials showed voltage controlled differential negative resistance over a certain range of applied electric fields. Phenomenon of this general kind was first reported by J. B. Gunn (Solid State Communications, Volume 1, page 88, 1963) and is therefore generally known as the Gunn effect. The cause of the negative resistance is vastly different from one material to another. It is due, for example, to the field dependent trapping effect in gold-doped germanium, to phonon-electron interaction in cadmium sulfide and to the intervalley shifting of charge carriers in gallium arsenide.

The intervalley shifting effect in multivalley semiconductive materials used to produce oscillatory outputs has gained considerable interest in the prior art. The conventional Gunn effect-type devices involving the technique of intervalley shifting of charge carriers use semiconducting materials with inequivalent energy-momentum valleys. The energy and mobility of charge carriers in certain valleys must be different from that in other valleys in order to obtain negative differential conductivity when a transfer or shifting of carriers takes place. It has been assumed in the prior art that the principles of intervalley shifting used to produce oscillatory outputs were restricted to materials in which inequivalent energy-momentum valleys were an inherent characteristic.

It is therefore another object of this invention to use new semiconducting materials that can be arranged in an appropriate apparatus to show the intervalley shifting effect and to produce oscillatory outputs.

Moreover, the tuning or changing of the frequency of the oscillations produced in the Gunn effect devices has been the subject of many recent prior art disclosures. It is noted that most of these proposals involve rather complicated methods of fabrication and operation.

It is therefore a still further object of the invention to develop a relatively simple device to produce as an output reasonably tunable Gunn effect-type oscillations.

SUMMARY OF THE INVENTION

The basis of the invention resides in the provision of improved stimulated spin-flip Raman scattering and Gunn effect-type oscillations by employing degenerate multivalley semiconductors such as lead telluride. Both phenomena can be obtained in an apparatus of the same configuration either independently or simultaneously.

A distinct feature of the invention is that under the influence of an applied electric field, the stimulated Raman scattering is characterized by an increase in saturation level, thus providing increased Raman oscillator output power.

Another feature of the invention is that Gunn effect-type oscillations can be obtained in the microwave frequency range and can be coupled to an external circuit to give a microwave power output.

A still further feature and advantage of the invention is that in both embodiments above, broad tunability is achieved by varying the magnitude of an applied magnetic field which determines the spacing between the spin sublevels of the Landau levels in the semiconducting material.

BRIEF DESCRIPTION OF THE DRAWINGS

A more complete understanding of the foregoing and other features according to the invention can be obtained from the following detailed description with reference to the accompanying drawings, in which.

DETAILED DESCRIPTION OF ILLUSTRATIVE EMBODIMENTS

Raman scattering from mobile charge carriers in the presence of a magnetic field in materials having nonparabolic conduction bands is inelastic in that either a fraction of the energy input light photon is absorbed by the charge carrier or a like fraction of energy is given up by the charge carrier to the input light photon. The absorption or emission involves the quantized energy levels known as Landau levels, which are produced by the magnetic field. Thus, the coherent output photon is characterized by an energy equal to the input photon energy minus the quantum of absorbed energy, or plus the quantum of emitted energy. Spin-flip Raman scattering is characterized by a change in the spin state of the carrier. The energy separation of the spin states due to the applied magnetic field between which a spin reversal transition can occur is given by $$E_{sp}=\hbar\omega_{sp}=\hbar\mu_B gB \quad (1)$$

where $E_{sp}$ is the spin energy splitting, $\hbar$ is Planck's constant in appropriate units divided by $2\pi$, $\omega_{sp}$ is the spin-splitting in frequency, $\mu_B$ is the Bohr magneton, $g$ is the g-value or the effective gyromagnetic ratio for electrons in the material, and $B$ is the magnitude of the magnetic field. The frequency of the spin-flip Raman scattered radiation $\omega_s$ is tunable by varying the magnitude of a magnetic field as $$\omega_s = \omega_o - g\mu_B B \qquad (2)$$

where $\omega_o$ is the frequency of the input pump radiation and $g$, $\mu_B$, and $B$ are defined above. In order to obtain stimulated Raman scattering, one requires a Raman gain large enough to overcome losses in the Raman oscillator cavity. The Raman gain is defined as the rate of growth of the number of photons in a given optical mode at the Raman shifted frequency and is proportional to the cross section of the particular type of scattering used. The spin-flip Raman cross section for stimulated Raman scattering is relatively large making the spin-flip process most promising for achieving stimulated scattering.

Figure 1:
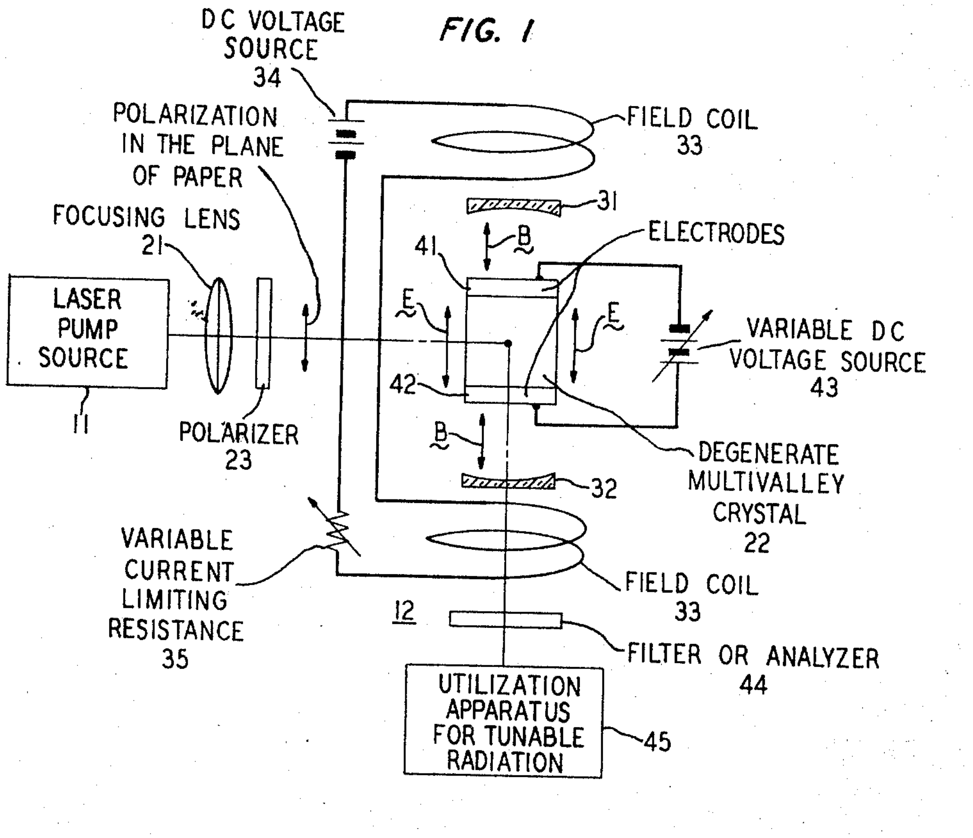
FIG. 1 is a partially pictorial and partially schematic illustration of a first embodiment of the invention.

For a complete understanding of the novel features of the first embodiment of the invention and the advantages thereof, reference is first made to FIG. 1 in which the laser pump source 11 supplies coherent pumping radiation to the tunable Raman oscillator 12 including the degenerate multivalley crystal 22, means for resonating the scattered radiation comprising reflectors 31 and 32, and means for applying magnetic and electric fields to the crystal including the field coil 33 and the electrodes 41 and 42, respectively.

The laser pump source is illustratively a high-power Q-switched carbon dioxide laser of the type described in the patent application of C. K. N. Patel, Ser. No. 495,844, filed Oct. 14, 1965, now abandoned in favor of the copending application of C. K. N. Patel, Ser. No. 814,510, now U.S. Pat. No. 3,596,202 filed on Mar. 28, 1969 and assigned to the assignee hereof. From the laser 11, as described, the pumping radiation typically has a wavelength of 10.6 microns.

It is desirable to include the lens 21 disposed in the path of the laser output to focus the beam to a spot size close to the cross-sectional area of the crystal 22. The polarizer 23 polarizes the coherent laser radiation to be in the plane of the paper as shown in FIG. 1 and illustratively parallel to a selected crystalline axis of the crystal 22, as described hereinafter. If the radiation from the carbon dioxide laser is already linearly polarized, a polarizer-and-analyzer assembly is substituted for polarizer 23 to provide control over the polarization. The laser 11 should provide radiation having a photon energy comparable to (but slightly smaller than) the bandgap energy of the multivalley crystal 22 in the Raman oscillator 12 for best results.

The Raman oscillator 12 illustratively comprises a single crystal of N-type lead telluride (PbTe) with dimensions 2 × 2 × 2 cubic millimeters. The N-type PbTe can be grown by vapor deposition and properly annealed to have an electron concentration of 8 to 10 × $10^{16}$ per cubic centimeter. The crystal 22 illustratively includes anti-reflection coatings (not shown) on the lateral surfaces to prevent reflection of the pump or scattered radiation. Totally reflective reflector 31 and the partially transmissive reflector 32 are aligned along the expected axis of the scattered radiation, which in this case, is orthogonal to the direction of the pump radiation. Reflectors 31 and 32 form the resonator for the scatered radiation.

The bidirectionally reflected scattered radiation, in this case orthogonal to the direction of the pump radiation, may have a direction in the plane of the paper as shown in FIG. 1, or orthogonal both to the pump radiation and the plane of the paper of that figure. The former direction was chosen for the drawings because of the ease in illustrating the apparatus that it presented. If the latter direction is chosen, the reflectors 31 and 32 would be appropriately moved to accommodate the scattered radiation. In all embodiments of the invention, the geometries illustrated are not critical, for variation therefrom in appropriate apparatus can still produce the desired results.

Figures 2, 3:
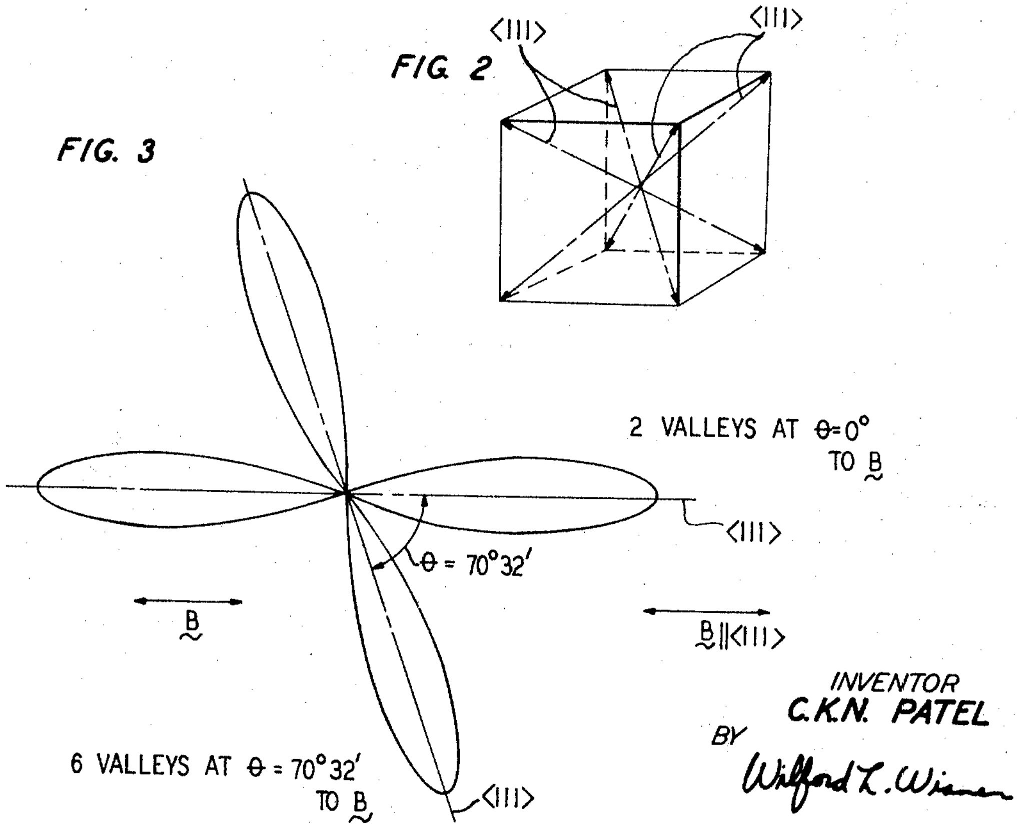
FIG. 2 shows a cubic cell, with the eight <1 1 1> directions indicated, useful in explaining the operation of the invention.
FIG. 3 illustrates the electron valley orientations in lead telluride when the uniform magnetic field is applied in a direction parallel to one of its <1 1 1> crystalline axes.

The Raman oscillator 12 further includes the field coil 33 adapted to provide a uniform magnetic field within crystal 22. The coil 33 is energized from the DC voltage source 34 connected through the variable current-limiting resistance 35 to the terminals of coil 33. The coil 33 is oriented to supply a magnetic field parallel to the polarization of the pumping radiation and orthogonal to the direction of propagation of the pumping radiation as shown. The crystal 22, disposed in the path of propagation of the pumping radiation from laser 11, is oriented and adapted so that one of the <111>crystalline axes of the crystal is parallel to the direction of the magnetic field. Reference is made to FIG. 2 of the drawing showing a cubic cell with the four <111> crystalline axes designated.

The coil 33 could be a field coil which has its two sections spaced apart about crystal 22 as illustrated. In operation, the coherent 10.6 micron radiation from the Q-switched carbon dioxide laser 11 is incident upon the crystal 22 with pulses having peak power in the range from 1 to 100 kilowatts. It is focused to a cross-sectional area at the crystal 22 that is sufficient to exceed the threshold power intensity for stimulated Raman radiation therein. The threshold power intensity is approximately $10^6$ watts per square centimeter for lead telluride using the $CO_2$ laser at 10.6 microns. If the threshold power density is otherwise supplied (i.e., on a CW basis), Q-switching of laser 11 is unnecessary.

The apparatus of FIG. 1 also includes the electrodes 41 and 42 disposed on lateral surfaces of the crystal 22 with a relative orientation that provides a uniform electric field in the crystal parallel to the <111> crystalline axis and the direction of the uniform magnetic field produced by coil 33, again as shown in FIG. 1. The electrodes 41 and 42 are illustratively rings so as not to interrupt the propagation of the scattered radiation. Connected between electrodes 41 and 42 is the variable DC voltage source 43.

The output radiation from the crystal 22 passes through the filter or analyzer 44 and is utilized in apparatus 45, such as a heterodyne stage of an optical communication receiver. As is well known, a tunable local oscillator signal is highly useful for such applications. Nevertheless, the utilization apparatus 45 could be one of a number of other means for utilizing tunable radiation.

A cooling apparatus (not shown) may also be provided to cool the crystal 22, preferably to 77° Kelvin, or lower. Typically, it would comprise one or more cold fingers on a lateral surface of the crystal 22 beyond the limits of the electrodes 41 and 42.

The strength of the magnetic field of coil 33 should be sufficient to Provide a significant frequency spacing between the spin sublevels of the Landau levels for the conduction electrons. For lead telluride, fields up to 100 kiloGauss appear reasonable for the spin-flip transition. Clearly, the larger the magnitude of the magnetic field, the greater the energy separation of the respective spin-flip states. Additionally, for other materials that have larger bandgaps, larger magnetic fields would be used in each case.

The electric field between electrodes 41 and 42 in the present embodiment has two functions. First, it accelerates the electrons normal to the direction of propagation of the coherent pumping radiation from laser 11, thereby increasing the number of electrons per unit time available for the spin-flip Raman scattering. Secondly, it imparts kinetic energy to electrons to facilitate their transfer between the inequivalent energy-momentum valleys in the material. For lead telluride, electric fields in the range of 100 volts per centimeter are sufficient.

Instead of lead telluride, crystal 22 could also be lead tin telluride ($Pb_{1-x}Sn_xTe$), or mercury cadmium teluride ($Hg_{1-x}Cd_xTe$), or other degenerate multivalley semiconductors with Raman gain sufficient to produce stimulated spin-flip scattering. Alternatively P-type materials of the compounds recited can also be used preferably with the application of uniaxial stress. In general, any body of a material having nonparabolic conduction bands could be employed, provided magnetic field strengths were sufficient.

The operation of and principles underlying the first embodiment of the invention are now explained.

It is known that lead telluride has eight equivalent <111> energy-momentum valleys in which the conduction electrons are located. These electron valleys are cigar-shaped ellipsoids along the <111> axes as illustrated in FIG. 3 of the drawings. In the absence of an applied magnetic field, these valleys are normally equivalent; and no electron transfer among them takes place. Under these circumstances, lead telluride is said to exhibit the condition of equivalent energy-momentum valleys.

The condition of equivalency of these valleys can be readily removed by the application of an appropriate magnetic field. The energy levels or states for the electron in the valleys in the presence of a magnetic field are quantized to have a nonzero energy spacing and are also split by the differing possible spin states of the electrons. The energy spacing of the energy levels commonly referred to as Landau levels is given approximately by $$E_c = \hbar\omega_c = \hbar eB/m^*c \qquad (3)$$

where $E_c$ is the Landau energy separation, $\omega_c$ is the cyclotron frequency, $\hbar$ is Planck's constant in appropriate units divided by $2\pi$, $e$ is the Coulombic charge of the electron, $m^*$ is the effective mass of the electron, $c$ is the velocity of light in a vacuum, and B is the magnitude of the magnetic field. The energy separation of the spin sets is given by Equation (1) above.

In the present invention, the magnetic field is applied in a direction parallel to one of the <111> crystalline axes of lead telluride. In this case, two of the <111> electron valleys lie at $\theta=0°$ to the direction of the magnetic field, and six other 111> electron valleys are located at $\theta=70°32'$ with respect to the direction of the magnetic field. This is illustrated in the accompanying FIG. 3 of the drawings.

With the application of the magnetic field, the valleys at $\theta=0°$ to the magnetic field are moved by different energy amounts compared to the electron valleys at $\theta=70°32'$ to the magnetic field because of different electron effective masses in the valleys at two different angular positions. The magnitude of the magnetic field is now chosen such that $$\tfrac{1}{2}(\hbar\omega_{c1} - g_1\mu B) < \tfrac{1}{2}(\hbar\omega_{c2} - g_2\mu B) + E_{F_2}(B) < \tfrac{1}{2}(\hbar\omega_{c1} + g_1\mu B \qquad (4)$$

where the subscript 1 applies to $\theta=0°$ electrons and 2 applies to the $\theta=70°32'$ electrons, $\omega_c$ is the cyclotron frequency of electrons in the valleys, $E_{F_2}(B)$ is the Fermi energy level of the $\theta=70°32'$ valley which is a function of the magnetic field, and the other parameters are defined above.

Figure 4:
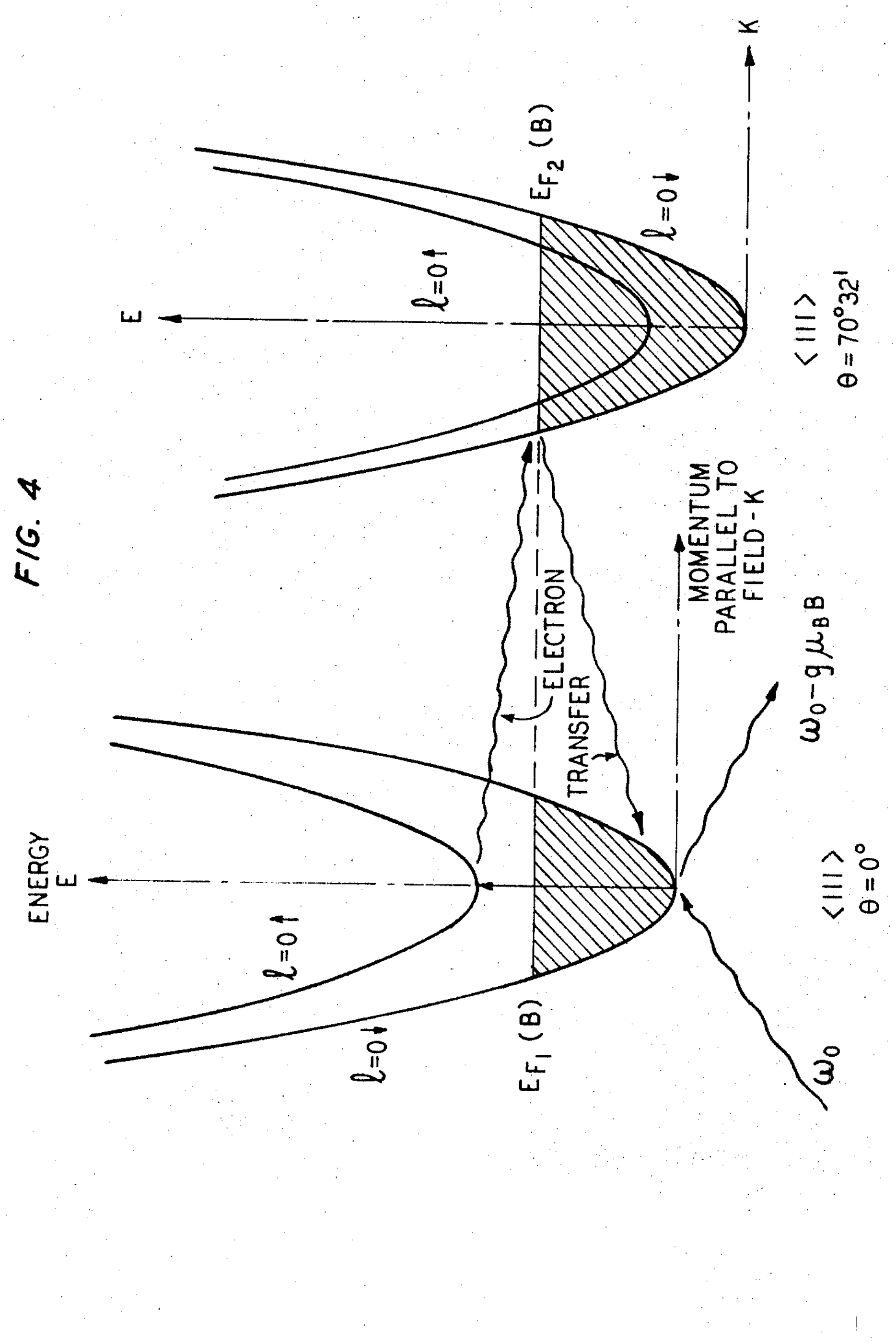
FIG. 4 shows an energy level diagram that will be helpful in understanding the operation of the first embodiment of the invention.

This produces a condition as illustrated in FIG. 4 of the drawings in which the valleys are no longer equivalent but have different cyclotron and spin state separation energies. The energy and mobility of the electrons in the spin-down state (indicated by the arrow pointing down) of the $\theta=0°$ valleys are higher than that of the electrons in the $\theta=70°32'$ valleys but not high enough to give rise to electron transfer between the valleys without further excitation. However, if the electron in the spin-down state of the $\theta=0°$ valleys happens to get excited to the upper spin sublevel, these have a high probability of transferring over to the $\theta=70°32'$ valleys.

Now consider doing Raman scattering from the spin-flip of the above-mentioned electrons in the $\theta=0°$ valleys. The Raman gain, for the magnetic field parallel to one of the <111> crystalline axes in lead telluride, is large enough to overcome the optical losses in a Raman oscillator cavity. Therefore, it is possible to obtain stimulated spin-flip Raman scattering from the $\theta=0°$ valley electrons. With scattering of this type, a large number of spin-down electrons will be excited to the spin-up sublevel (indicated by the arrow pointing up) in the $\theta=0°$ valleys. These electrons cannot relax directly back down to the spin-down sublevel through radiative processes and can lead to the type of saturation of spin-flip Raman scattering power that one observes in prior art devices. In the present invention, however, since Equation (4) is satisfied, the spin-up electrons in the $\theta=0°$ valley very quickly transfer over to the $\theta=70°32'$ valleys. But this is also an unstable situation because the spin-down levels of the $\theta=0°$ valleys are now nearly empty. Since Equation (4) is still valid, the electrons must transfer back from the $\theta=70°32'$ valleys to the $\theta=0°$ spin-down sublevels; and the Raman scattering process is made to continue.

The effect of the applied electric field is to increase the momenta along the field direction and the kinetic energy of the electrons in the $\theta=70°32'$ valleys moving them further out from the vertices and higher up on the energy-momentum curves shown in FIG. 4. This increases the probability of transfer of electrons back to the spin-down sublevel of the $\theta=0°$ electron valleys. The electric field is also functional in increasing the drift rate of electrons normal to the direction of propagation of the coherent pumping radiation from laser 11. This results in an increase in the number of electrons per unit time available for scattering.

The resultant effect is a decrease in the effective spin relaxation time, an increase in the saturation level for spin-flip Raman scattering, and finally an increase in the spin-flip Raman oscillator output power.

In the second embodiment of the invention, new multivalley semiconductive materials, described hereinafter in reference to FIG. 5, exhibit the intervalley shifting effect in producing improved oscillatory outputs. In conventional multivalley materials, when electrons are accelerated to a certain kinetic energy by an applied electric field inside the bulk material, they acquire enough energy to jump into a different energy-momentum valley of the conduction band where the mobility is low compared to the original valley. As the applied field increases, more and more electrons come to the low mobility state. The material in turn exhibits the differential negative resistance effect giving rise to a nonuniform electric field distribution in a region of the material.

Assuming the electric field is applied between two electrodes on the bulk material, small domains may form near the cathode of the device within which the electric field is very high. In the rest of the device outside of the domain, the field has a small value. This situation is inherently unstable and the high-field domain moves across the device from one electrode to the other. As it disappears at the other electrode, a new high-field domain nucleates. Electrical instabilities in the form of current oscillations, generally of the microwave frequency range, can be obtained in a circuit connected between the electrodes. The period of the resulting current oscillations is proportional to the transit time for the moving high-field domain to traverse the length of the device.

Figure 5:
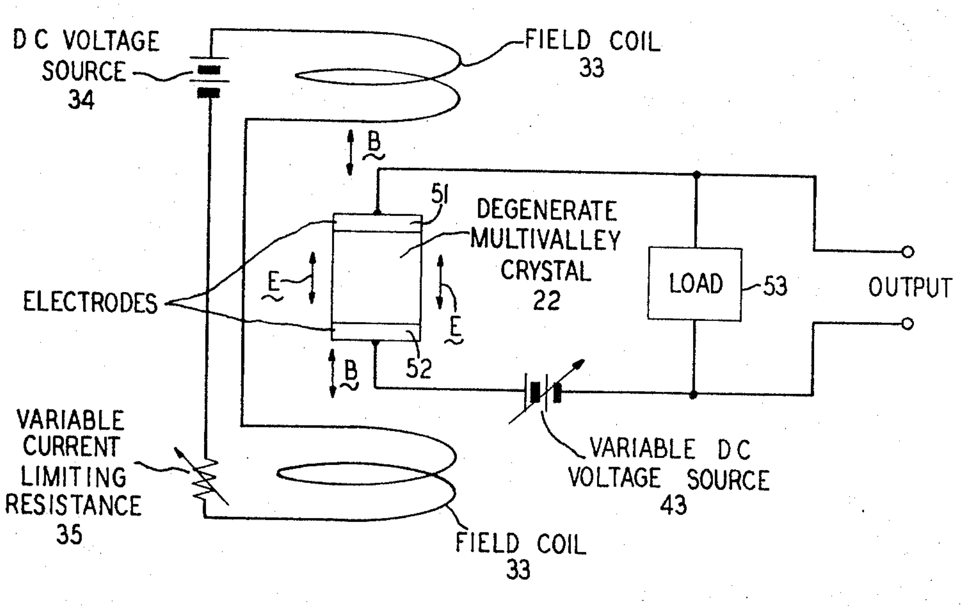
FIG. 5 is a partially pictorial and partially schematic illustration of a second embodiment of the invention.

In the embodiment of FIG. 5 of the drawings, microwave oscillations are obtained from an apparatus including the multivalley crystal 22 subject to a magnetic field similar to that utilized in the first embodiment of the invention. Here, components numbered the same as in FIG. 1, are identical thereto. Field coil 33 is adapted to provide a uniform magnetic field within the crystal 22 of N-type lead telluride. The coil is energized from the DC source 34, connected through the variable current limiting resistance 35, to the terminals of the coil. The coil is disposed to supply a magnetic field with a direction as shown. The crystal 22 is oriented and adapted so that one of the <111> crystalline axes thereof has a direction parallel to that of a uniform magnetic field.

The apparatus of FIG. 5 additionally includes electrodes 51 and 52 disposed on a lateral surface of the crystal 21 with a relative orientation that provides an electric field substantially in the same direction as the magnetic field produced by coil 33. Thus the electric field has a direction parallel to the direction of the <111> crystalline axis of the lead telluride crystal 22. Connected between the electrodes 51 and 52 is the variable DC voltage source 43 and load 53 used to extract the oscillatory component of current flowing in crystal 22.

The strength of the magnetic field should be such that it produces substantial splitting of the spin-states of the Landau levels for conduction electrons in the crystals. Magnetic field strengths greater than those used in the first embodiment of the invention and up to 150 kiloGauss are suitable. The magnitude of the electric field should be large enough to increase the kinetic energy of electrons sufficiently to give rise to an intervalley shifting of electrons in crystal 22 as discussed above. As in the first embodiment, voltage gradients in the rang of 100 volts per centimeter are sufficient to produce the desired results.

With the application of the magnetic field parallel to the <111> crystalline axis in lead telluride, the different valleys move by different energy amounts because of the different effective masses. The magnitude of the magnetic field in the present embodiment is chosen such that $$\tfrac{1}{2}(\hbar\omega_{c_1} - g_1\mu B) > \tfrac{1}{2}(\hbar\omega_{c_2} - g_2\mu B) + E_{F_2}(B) \qquad (5)$$

where the symbols and subscripts are defined above.

Figure 6:
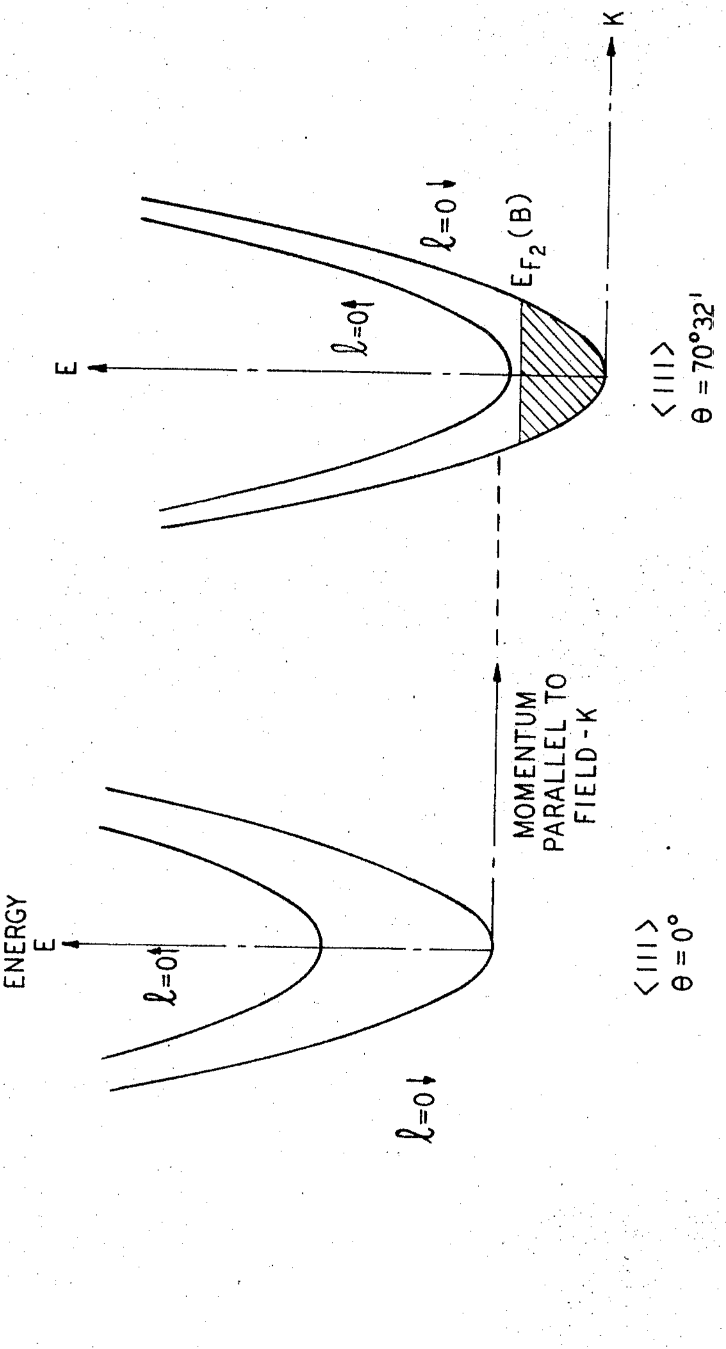
FIG. 6 shows an energy level diagram that will be helpful in understanding the operation of the second embodiment of the invention.

The condition resulting is illustrated in FIG. 6 of the drawings. All the electrons from the $\theta$=0° valleys will be transferred to the $\theta$=70°32′ valleys. This leaves the $\theta$=0° valleys empty and $\theta$=72°32′ valleys with electrons in them. In this condition the crystal is reminescent of the gallium arsenide case discussed above.

On application of the electric field, the $\theta$=70°32′ electrons, the only ones present at this time, gain kinetic energy; and Equation (5) is no longer satisfied. This will transfer electrons from the $\theta$=70°32′ valleys to the $\theta$=0° valleys and the effective mobility and conductivity of the lead telluride sample will change. An instability in the conductivity of the lead telluride sample will be set up because of the electrons which are now oscillating between the $\theta$=0° and $\theta$=70°32′ valleys. A microwave component of current in the sample will arise which is coupled to the external circuit through the electrodes 51 and 52 to give a microwave power output.

A distinct advantage of the present embodiment is that the frequency of the current oscillations can be changed simply by changing the applied magnetic field. The result is a reasonably tunable Gunn effect-type microwave oscillator.

Figure 7:
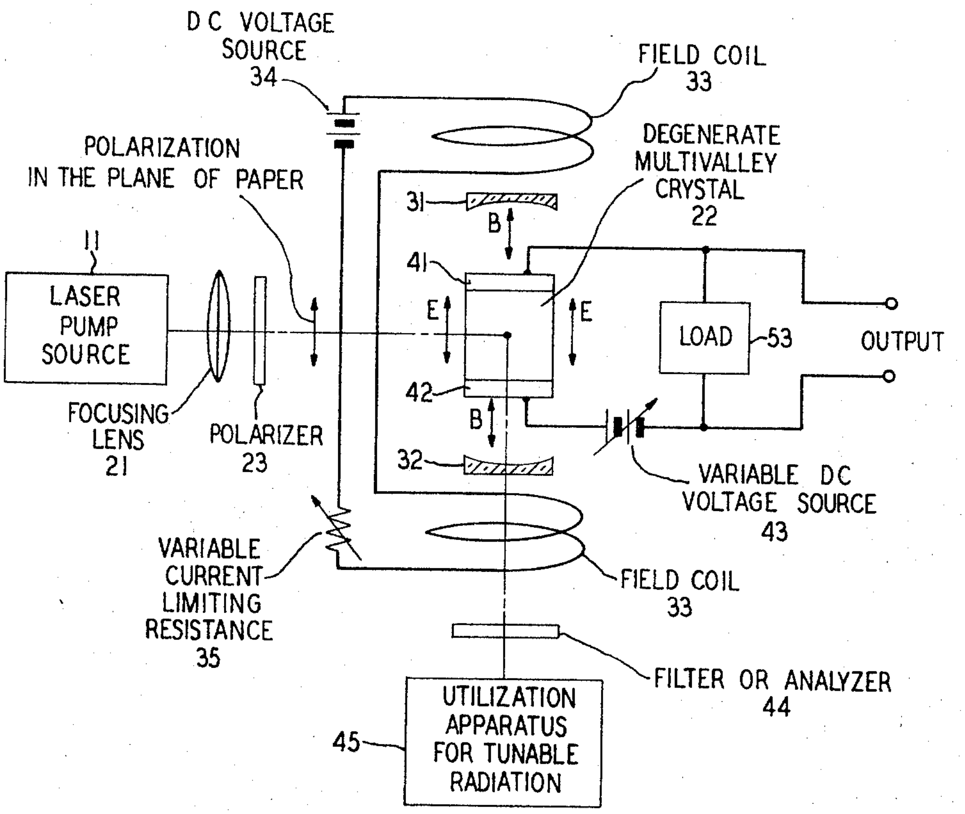
FIG. 7 is a partially pictorial and partially schematic illustration of a third embodiment of the present invention.

FIG. 7 presents a third embodiment of the invention in which both improved outputs of spin-flip Raman oscillation and Gunn effect-type oscillation are simultaneously generated. Components numbered the same as in FIG. 1 and FIG. 5 of the drawings are identical thereto.

The crystal 22 of N-type lead telluride is again oriented and adapted so that one of its <111> crystalline axes is parallel to the direction of the magnetic field and the electric field. Included in the present embodiment, is the external circuit containing load 53 and coupled to the crystal 22 through electrodes 41 and 42.

The strength of the magnetic and electric field to produce the desired results is substantially the same as those recited in the first embodiment of the invention, or approximately 100 kiloGauss and 100 volts per centimeter, respectively. Particularly, the magnitude of the magnetic field is chosen so that Equation (4) hereinabove is valid.

The operation of the third embodiment of the invention is essentially identical to that of the first embodiment, with means added for extracting the oscillatory component of current arising in the crystal. Electrical instabilities due to electrons oscillating between the $\theta$=0° and $\theta$=70°32′ electron valleys, are driven at least in part by the stimulated scattering which excites the spin-down electrons in $\theta$=0° valleys to the spin-up sublevel where transfer becomes possible. Periodic changes in the conductivity of the sample give rise to the current oscillations which are extracted as an output through load 53.

I claim:

1. A device for producing increased spin-flip Raman oscillator power output comprising:
   - a crystal of multivalley semiconducting material in which the condition of degenerate and equivalent energy-momentum valleys for mobile charge carriers exists,
   - means for applying to said crystal a uniform magnetic field of direction and magnitude sufficient to produce unequal splitting of the spin energy sublevels of the Landau energy levels in said valleys at different angular orientations to said magnetic field thereby to render the latter energy-momentum valleys inequivalent,
   - means for applying coherent pumping radiation to said crystal in a direction to obtain stimulated spin-flip Raman scattering from said charge carriers in at least one of said inequivalent valleys, and
   - means for applying to said crystal an electric field to facilitate the transfer of said charge carriers between said inequivalent valleys whereby the saturation level of the Raman scattering is increased.

2. A device as claimed in claim 1 in which said means for applying an electric field comprises means for producing in said crystal a nearly static electric field of magnitude and direction sufficient to drift said charge carriers normal to the direction of propagation of said coherent pumping radiation at a rate to facilitate the transfer of said charge carriers between said inequivalent valleys in said material.

3. A device according to claim 1 in which said crystal of multivalley semiconducting material includes material selected from the group consisting of lead telluride (PbTe), lead tin telluride $(Pb_{1-x}Sn_xTe)$, and mercury cadmium telluride $(Hg_{1-x}Cd_xTe)$.

4. A device as claimed in claim 3 in which the magnitude of said uniform magnetic field varies in the range such that $$\tfrac{1}{2}(\hbar\omega_{c_1} - g_1\mu B) < \tfrac{1}{2}(\hbar\omega_{c_2} - g_2\mu B) + E_{F_2}(B) < \tfrac{1}{2}(\hbar\omega_{c1} + g_1\mu B)$$

where $\hbar$ is Planck's constant in appropriate units divided by $2\pi$, $\omega_c$ is the cyclotron frequency produced by the magnetic field, $g$ is the g-value or effective gyromagnetic ratio for said charge carriers in the material, $\mu$ is the Bohr magneton, $B$ is the magnitude of the magnetic field, $E_F(B)$ is the Fermi energy of said charge carriers which is a function of the magnitude of the magnetic field and the subscripts 1 and 2 apply respectively to two inequivalent valleys between which transfer of said charge carriers takes place.

5. A Gunn-effect type device comprising:
   - a crystal of multivalley semiconducting material in which the condition of degenerate and equivalent energy-momentum valleys for mobile charge carriers exists,
   - means for applying to said crystal a uniform magnetic field of direction and magnitude sufficient to produce unequal splitting of the spin energy sublevels of the Landau energy levels in said valleys at different angular orientations to said magnetic field,
   - means for applying to said crystal an electric field of magnitude in excess of a threshold value to provide in said crystal electrical instabilities at microwave frequencies, and
   - means for varying the magnitude of said magnetic field to tune the frequency of said electrical instabilities.

6. A device as claimed in claim 5 in which said means for applying a uniform electric field comprises means for producing in said crystal a nearly static electric field of magnitude and direction sufficient to give rise to the transfer of said charge carriers between said inequivalent valleys in said material.

7. A device according to claim 5 in which said crystal of multivalley semiconducting material includes materials selected from the group consisting of lead telluride (PbTe), lead tin telluride $(Pb_{1-x}Sn_xTe)$, or mercury cadmium telluride $(Hg_{1-x}CdTe)$.

8. A device as claimed in claim 7 in which the magnitude of said uniform magnetic field varies in the range such that $$\tfrac{1}{2}(\hbar\omega_c - g_1\mu B) > \tfrac{1}{2}(\hbar\omega_{c_2} - g_2\mu B) + E_{F_2}(B)$$

where $\hbar$ is Planck's constant in appropriate units divided by $2\pi$, $\omega_c$ is the cyclotron frequency produced by the magnetic field, $g$ is the g-value or effective gyromagnetic ratio for said charge carriers in the material, $\mu$ is the Bohr magneton, $B$ is the magnitude of the magnetic field, $E_F(B)$ is the Fermi energy of said charge carriers which is a function of the magnitude of the magnetic field and the subscripts 1 and 2 apply respectively to two inequivalent valleys between which transfer of said charge carriers takes place.

9. A device for simultaneously producing Raman oscillator power output and Gunn effect-type oscillations comprising:
   - a crystal of multivalley semiconducting material in which the condition of degenerate and equivalent energy-momentum valleys for mobile charge carriers exists,
   - means for applying to said crystal a uniform magnetic field of direction and magnitude sufficient to produce unequal splitting of the spin energy sublevels of the Landau energy levels in said valleys at different angular orientations to said magnetic field thereby to render the latter energy-momentum valleys inequivalent, means for applying coherent pumping radiation to said crystal in a direction to obtain stimulated spin-flip Raman scattering from said charge carriers in at least one of said inequivalent valleys, and means for applying to said crystal an electric field to facilitate the transfer of said charge carriers between said inequivalent valleys and to cooperate with said scattering to provide in said crystal electrical instabilities at microwave frequencies.

10. A device as claimed in claim 9 in which said means for applying an electric field comprises means for producing in said crystal a nearly static electric field of magnitude and direction sufficient to drift said charge carriers normal to the direction of propagation of said coherent pumping radiation at a rate to facilitate the transfer of said charge carriers between said inequivalent valleys in said material.

11. A device according to claim 9 in which said crystal of multivalley semiconducting material includes materials selected from the group consisting of lead telluride (PbTe), lead tin telluride ($Pb_{1-x}Sn_xTe$), or mercury cadmium telluride ($Hg_{1-x}CdTe$).

12. A device as claimed in claim 11 in which the magnitude of said uniform magnetic field varies in the range such that $$\tfrac{1}{2}(\hbar\omega_{c_1}-g_1\mu B)<\tfrac{1}{2}(\hbar\omega_{c_2}-g_2\mu B)+E_{F_2}(B)<\tfrac{1}{2}(\hbar\omega_c+g_1\mu B)$$

where $\hbar$ is Planck's constant in appropriate units divided by $2\pi$, $\omega_c$ is the cyclotron frequency produced by the magnetic field, $g$ is the g-value or effective gyromagnetic ratio for said charge carriers in the material, $\mu$ is the Bohr magneton, $B$ is the magnitude of the magnetic field, $E_F(B)$ is the Fermi energy of said charge carriers which is a function of the magnitude of the magnetic field and the subscripts 1 and 2 apply respectively to two inequivalent valleys between which transfer of said charge carriers takes place.

13. A device for producing increased spin-flip Raman oscillator power output comprising:

a crystal of degenerate multivalley semiconducting material in which a <111> crystalline axis and equivalent energy-momentum valleys for mobile charge carriers exist, means for applying to said crystal a uniform magnetic field of direction and magnitude sufficient to produce unequal splitting of the spin energy sublevels of the Landau energy levels in said valleys at different angular orientations to said magnetic field thereby to render the latter energy-momentum valleys inequivalent, means for orienting and adapting said crystal such that one of the <111> crystalline axes of said material is in a direction parallel to the direction of said uniform magnetic field, means for applying coherent pumping radiation to said crystal in a direction to obtain stimulated spin-flip Raman scattering from said charge carriers in at least one of said inequivalent valleys, means for applying to said crystal an electric field in a direction parallel to the direction of said uniform magnetic field to facilitate the transfer of said charge carriers between said inequivalent valleys, and means for varying the magnitude of said magnetic field to tune the frequency of said scattering.

14. A Gunn effect-type device comprising:

a crystal of degenerate multivalley semiconducting material in which a <111> crystalline axis and equivalent energy-momentum valleys for mobile charge carriers exist, means for applying to said crystal a uniform magnetic field of direction and magnitude sufficient to produce unequal splitting of the spin energy sublevels of the Landau energy levels in said valleys at different angular orientations to said magnetic field, means for orienting and adapting said crystal such that one of the <111> crystalline axes of said material is in a direction parallel to the direction of said uniform magnetic field, means for applying to said crystal an electric field of magnitude in excess of a threshold value and in a direction parallel to the direction of said uniform magnetic field to provide in said crystal electrical instabilities at microwave frequencies, and means for varying the magnitude of said magnetic field to tune the frequency of said electrical instabilities.

15. A device for simultaneously producing Raman oscillator power output and Gunn effect-type oscillations comprising:

a crystal of degenerate multivalley semiconducting material in which a <111> crystalline axis and equivalent energy-momentum valleys for mobile charge carriers exist, means for applying to said crystal a uniform magnetic field of direction and magnitude sufficient to produce unequal splitting of the spin energy sublevels of the Landau energy levels in said valleys at different angular orientations to said magnetic field thereby to render the latter energy-momentum valleys inequivalent, means for orienting and adapting said crystal such that one of the <111> crystalline axes of said material is in a direction parallel to the direction of said magnetic field, means for applying coherent pumping radiation to said crystal in a direction to obtain stimulated spin-flip Raman scattering from said charge carriers in at least one of said inequivalent valleys, means for applying to said crystal an electric field in a direction parallel to the direction of said magnetic field to facilitate the transfer of said charge carriers between said inequivalent valleys and to cooperate with said scattering to provide in said crystal electrical instabilities at microwave frequencies, and means for varying the magnitude of said magnetic field to tune the frequency of said scattered radiation and the frequency of said electrical instabilities.

* * * * *